United States Patent
Shimizu et al.

(10) Patent No.: US 9,158,428 B2
(45) Date of Patent: Oct. 13, 2015

(54) OPERATION DISPLAY DEVICE

(71) Applicants: Hideaki Shimizu, Tokyo (JP); Chohiko Fukuoh, Tokyo (JP)

(72) Inventors: Hideaki Shimizu, Tokyo (JP); Chohiko Fukuoh, Tokyo (JP)

(73) Assignee: Konica Minolta, Inc. (JP)

( * ) Notice: Subject to any disclaimer, the term of this patent is extended or adjusted under 35 U.S.C. 154(b) by 180 days.

(21) Appl. No.: 13/781,694

(22) Filed: Feb. 28, 2013

(65) Prior Publication Data

US 2013/0229370 A1    Sep. 5, 2013

(30) Foreign Application Priority Data

Mar. 1, 2012  (JP) .................................. 2012-45588

(51) Int. Cl.
G06F 3/048 (2013.01)
G06F 3/0482 (2013.01)
G06F 3/0488 (2013.01)
H04N 1/00 (2006.01)

(52) U.S. Cl.
CPC .............. *G06F 3/048* (2013.01); *G06F 3/0482* (2013.01); *G06F 3/04886* (2013.01); *H04N 1/00381* (2013.01); *H04N 1/00411* (2013.01); *H04N 1/00472* (2013.01)

(58) Field of Classification Search
CPC ..... G06F 3/048; G06F 3/0485; G06F 3/0486; G06F 3/0482; G06F 3/04886; G06F 3/04842; G06F 3/04817
USPC ................................................ 715/700–866
See application file for complete search history.

(56) References Cited

U.S. PATENT DOCUMENTS

2012/0066627 A1*   3/2012   Furukawa et al. ............ 715/768

FOREIGN PATENT DOCUMENTS

| JP | 10-187624   | 7/1998  |
|----|-------------|---------|
| JP | 2004-139321 | 5/2004  |
| JP | 2009-151691 | 7/2009  |
| JP | 2009-223426 | 10/2009 |
| JP | 2009-244967 | 10/2009 |
| JP | 2011-129062 | 6/2011  |
| JP | 2011-192173 | 9/2011  |
| JP | 2011-210040 | 10/2011 |
| JP | 2012-081649 | 4/2012  |

OTHER PUBLICATIONS

Notice of Reason for Refusal issued by JPO for appl. No. JP2012-045588, mailed Apr. 22, 2014, 4 pgs.
Translation of the Notice of Reason for Refusal issued by JPO for appl. No. JP2012-045588, mailed Apr. 22, 2014, 8 pgs.
Notice of Reason for Refusal for application No. JP 2012-045588, mailed Dec. 3, 2014, 2 pgs.
Translation of the Notice of Reason for Refusal for application No. JP 2012-045588, mailed Dec. 3, 2014, 5 pgs.

\* cited by examiner

*Primary Examiner* — Michael Pervan
(74) *Attorney, Agent, or Firm* — Squire Patton Boggs, (US) LLP

(57) ABSTRACT

Disclosed is an operation display device including: a touch panel unit to detect a touch position; a display unit; and a display control unit to execute a display according to a first display process on the display unit when a first operation is received on the touch panel unit, and to execute both of the display according to the first display process and a display according to a second display process when a second operation including an element of the first operation is received on the touch panel unit.

9 Claims, 14 Drawing Sheets

OPERATION DISPLAY DEVICE

BACKGROUND OF THE INVENTION

1. Field of the Invention

The present invention relates to an operation display device for receiving the operation by a touch panel and for executing the display process in accordance with the received operation.

2. Description of Related Art

In an operation display device using a touch panel for detecting the position in which the touch panel is touched with the user's finger or a pen, various types of operations, such as the selection operation for selecting the operation button, and the flick operation and the drag operation in which the user's finger or the pen is moved as the touch sensor is touched can be received.

In the touch panel type of operation display device as described above, various types of technologies for judging the type of operation received from the user more precisely, have been proposed.

For example, the following technology has been disclosed. In the technology, in consideration of the slight shift of the operation position which is possibly caused during the selection operation, the peripheral area of the operation position is set to the detection area, and the average value of the operation position in the detection area is determined as the final operation position (Japanese Patent Application Publication No. 2009-244967).

Further, the technology in which it is judged whether the operation is the selection operation or a gesture operation, such as the flick operation in accordance with the distance mount from the touch position to the untouch position at which the finger is released from the touch panel, has been known (Japanese Patent Application Publication No. 2009-151691).

The pressing force for carrying out the operation, such as the selection operation, the flick operation or the like, and the movement distance and the movement speed of the finger from the touch position are varied according to each user. Therefore, it is difficult to certainly identify the type of operation received from the user. For example, in the flick operation, after the touch panel is touched with the finger, when the finger is moved so as to flick the touch panel, there is some possibility that the pressing force is weakened shortly. Therefore, the device could recognize that the finger is released from the touch panel when the pressing force is weakened, and could wrongly judge that the operation carried out by the user who intends to carry out the flick operation is the selection operation.

In case that the device wrongly judges that the flick operation carried out by the user is the selection operation, the process relating to the selection operation which the user does not intend is executed. Therefore, after the user cancels the operation, the user is required to pay attention to the flick operation which is carried out again so as to avoid the wrong judgment of the device. As a result, considerable inconvenience was caused to the user. Also, in the capacitance type of touch panel, the above wrong judgment is caused. In particular, in the resistive type of touch panel, if the suitable pressing force is not applied, it is not recognized that the touch panel is touched with the finger. Therefore, the above wrong judgment was easily caused.

In addition, one operation is generally related to one display process, and is carried out to execute the related display process. In this configuration of the device, in order to execute two display processes, it is required to carry out two types of operations separately. As a result, the inconvenience could be caused.

SUMMARY

To achieve at least one of the abovementioned objects, an operation display device reflecting one aspect of the present invention comprises:

a touch panel unit to detect a touch position;

a display unit; and a display control unit to execute a display according to a first display process on the display unit when a first operation is received on the touch panel unit, and to execute both of the display according to the first display process and a display according to a second display process when a second operation including an element of the first operation is received on the touch panel unit.

Preferably, after the display control unit executes both of the display according to the first display process and the display according to the second display process, when an operation for affirming one of the first display process and the second display process is received from a user, the display control unit finishes the other display process or returns the display according to the other display process to an original display.

Preferably, the display control unit executes the display according to the second display process when a third operation is received, and the second operation is an intermediate operation between the first operation and the third operation.

Preferably, the first operation is a selection operation in which the touch panel unit is touched on a specific position, and the second operation is an operation in which an action for moving the touch position after the touch panel unit is touched is added.

Preferably, in case that a movement distance of the touch position is less than a first threshold value, the display control unit judges that the first operation is received and executes the display according to the first display process without executing the display according to the second display process;

in case that the movement distance of the touch position is not less than the first threshold value and less than a second threshold value which is larger than the first threshold value, the display control unit judges that the second operation is received and executes both of the display according to the first display process and the display according to the second display process; and in case that the movement distance of the touch position is not less than the second threshold value, the display control unit judges that the third operation is received and executes the display according to the second display process without executing the display according to the first display process.

Preferably, the first display process is a process for displaying a pop-up window, the second display process is a process for scrolling and displaying objects, and in case that the display control unit executes both of the display according to the first display process and the display according to the second display process, the display control unit displays the pop-up window by the first display process so as to show at least a part of the objects to be scrolled by the second display process.

Preferably, in case that the display control unit executes both of the display according to the first display process and the display according to the second display process, the display control unit stores a display position of the objects to be scrolled by the second display process, the display position being positioned before the objects are scrolled, and when an operation for affirming the displaying of the pop-up window displayed by the first display process is received, the display control unit displays the objects so as to return the objects scrolled by the second display process to the stored display position.

Preferably, when an operation for the objects strolled by the second display process is received in a state that the display control unit executes both of the display according to the first display process and the display according to the second display process, the display control unit closes the pop-up window which is displayed by the first display process.

Preferably, the first display process is a process for changing a window displayed on the display unit to another window, the second display process is a process for scrolling and display objects, and in case that the display control unit executes both of the display according to the first display process and the display according to the second display process, the display control unit calculates and stores a position of the objects strolled by the second display process and executes the change of the window to the another window by the first display process, and when the another window is returned to an original window, the display control unit executes a display in which the objects are moved to the stored position.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein:

FIG. 2 is a flowchart showing the process which is executed when the operation display device according to the first embodiment receives the operation via the user's finger, a pen or the like;

FIG. 9 is a flowchart showing the process which is executed when the operation display device according to the second embodiment receives the operation via the user's finger, a pen or the like;

FIG. 13 is a flowchart showing the process which is executed when the operation display unit according to the third embodiment receives the operation via the user's finger, a pen or the like.

DETAILED DESCRIPTION OF PREFERRED EMBODIMENTS

Hereinafter, preferred embodiments of the present invention will be explained with reference to the accompanying drawings.

Figure 1:
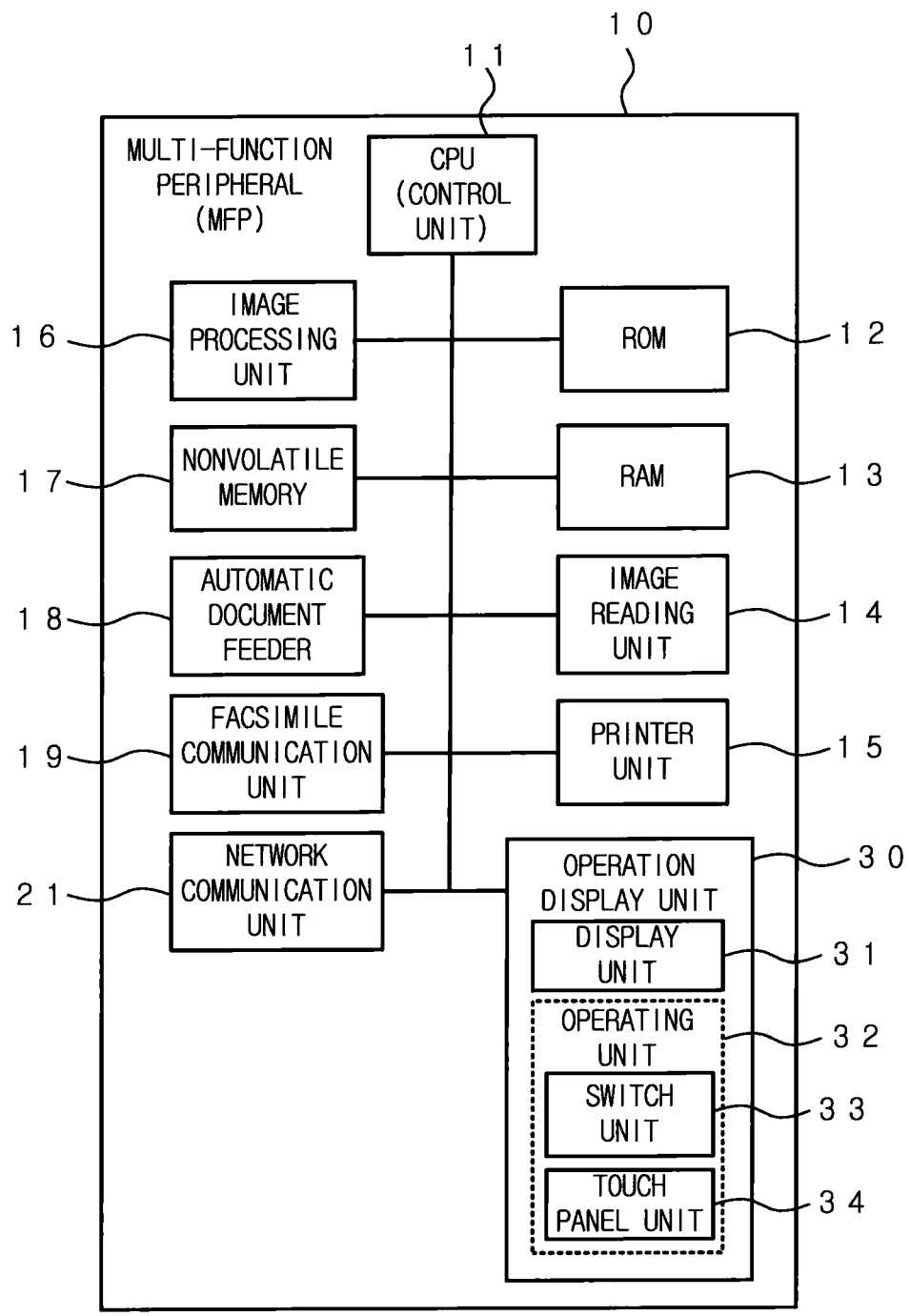
FIG. 1 is a block diagram showing a schematic configuration of the multi-function peripheral including the operation display device according to the first embodiment.

First Embodiment:

FIG. 1 is a block diagram showing the schematic configuration of the multi-function peripheral (MFP) 10 including the operation display device according to the first embodiment. The multi-function peripheral 10 is an image forming apparatus having the copy function for printing out the image obtained by optically reading an original, the print function for printing out the image in accordance with the image data received from an external terminal, the scan function for optically reading the original and for storing the image data obtained by reading the original or the like, the facsimile function and the like.

The multi-function peripheral 10 comprises a CPU (Central Processing Unit) 11 for controlling the whole operations of the multi-function peripheral 10. The CPU 11 is connected with a ROM (Read Only Memory) 12, a RAM (Random Access Memory) 13, an image reading unit 14, a printer unit 15, an image processing unit 16, a nonvolatile memory 17, an automatic document feeder 18, a facsimile communication unit 19, a network communication unit 21 and an operation display unit 30 via a bus.

By the CPU 11, a middleware, application programs and the like are executed on an OS (Operating System) program as a base. Further, the CPU 11 has a function as the display control unit to control the display contents of the operation display unit 30 of the operation display device according to the embodiment.

In the ROM 12, various types of programs are stored. By executing the processes by the CPU 11 in accordance with these programs, each function of the multi-function peripheral 10 is realized.

The RAM 13 is used as a work memory for temporarily storing various data when the CPU 11 executes the process in accordance with the programs and as an image memory for storing image data.

The image reading unit 14 has the function for optically reading the original to obtain the image data. For example, the image reading unit 14 comprises a light source for irradiating the original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The printer unit 15 has the function for forming an image based on the image data, on the recording paper. In this embodiment, the printer unit 15 is configured as an engine unit of the so-called laser printer for forming an image by the electrophotographic process. The laser printer comprises a conveying device for the recording paper, a photoconductive drum, a charging device, a laser unit, a developing device, a transfer and separation device, a cleaning device and a fixing device. The image may be formed by the inkjet system or another system.

The image processing unit 16 carries out the rasterization processing for converting print data into image data, compression/decompression processing of image data and the like, in addition to the processings, such as enlargement/reduction and rotation of the image.

The nonvolatile memory 17 is a memory (flash memory) in which the stored contents are not damaged even if the multi-function peripheral 10 is turned off, and is used for storing various types of setting information and the like.

The automatic document feeder 18 has the function for feeding the original sheet by sheet from the top sheet of the original set on the document setting unit and for conveying the original to the predetermined discharge position via the reading position of the image reading unit 14.

The facsimile communication unit 19 has the function for transmitting and receiving the image data to/from an external device having the facsimile function via a public line.

The network communication unit 21 has the function for communicating the data with a terminal device or another external device via a network, such as a LAN (Local Area Network).

The operation display unit 30 comprises a display unit 31 and an operating unit 32. The operating unit 32 comprises a switch unit 33 having a start button and the like, and a touch panel unit 34. The display unit 31 is configured by a liquid crystal display (LCD) or the like, and has a function for displaying various types of operation windows, setting windows and the like.

The touch panel unit 34 is provided on the upper surface of the screen of the display unit 31. The touch panel unit 34 detects the coordinate position at which the screen (in fact, the touch panel provided on the upper surface of the screen is directly pushed, however, in this specification, it is described that the screen is pushed.) is pushed with a touch pen, the user's finger or the like. In this specification, the action for touching the screen with the user's finger or the like is referred to as "touch". The action for releasing the user's finger or the like from the screen is referred to as "release". Hereinafter, the case in which the surface is touched with the user's finger, will be explained.

The operation display unit 30 of the multi-function peripheral 10 receives a plurality of types of operations, such as the selection operation, the flick operation, the drag operation and the like, as the operation for the touch panel unit 34.

The selection operation is the operation in which after the screen is touched with the user's finger, the finger is released from the screen without moving the finger from the touch position or with hardly moving the finger from the touch position. The flick operation is the operation in which after the screen is touched with the finger, the finger is released from the screen by moving the finger so as to flick the touch panel. The drag operation is the operation in which after the screen is touched with the finger, the finger is moved to the intended position in the state that the screen is touched with the finger and is released from the screen in the state that the finger is almost stopped. Further, the operation display device according to the first embodiment is configured by at least the display unit 31, the touch panel unit 34 and the CPU 11.

Next, the display process which is executed when the selection operation or the flick operation is received on the touch panel unit 34 of the operation display unit 30, will be explained.

Figure 2:
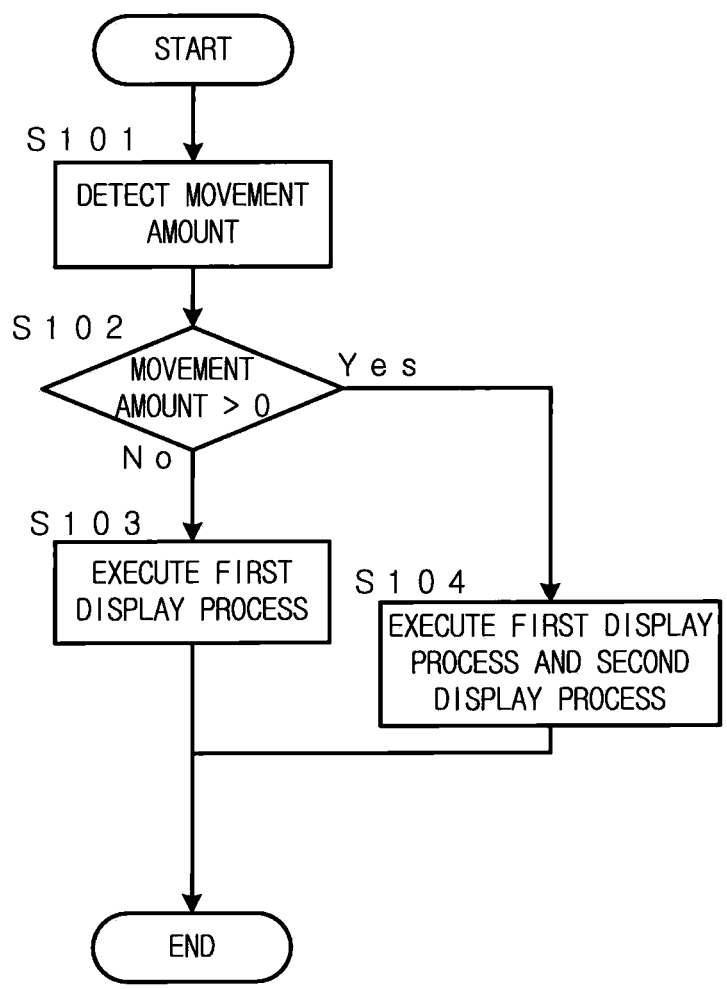

FIG. 2 shows the flowchart of the process which is executed when the operation display device according to the first embodiment receives the operation via the user's finger, a pen or the like. The CPU 11 which is the display control unit of the operation display device according to the first embodiment carries out the display according to the first display process on the display unit 31 when the touch panel unit 34 receives the first operation. Further, the CPU 11 carries out both of the display according to the first display process and the display according to the second display process when the second operation including the element of the first operation is received on the touch panel unit 34.

The phrase "the second operation includes the element of the first operation" means that the second operation includes the whole of the first operation or that the second operation includes a part of the first operation. The element is an optional element of the operation, and includes the touch, the move, the pushing time and the like. For example, the operation in which any action is added after the first operation is the second operation including the element of the first operation. That is, in case that if the second operation is stopped in midstream, the operation which has been carried out partway is treated as the first operation, the second operation is the operation including the element of the first operation. When the selection operation which has the element "touch" is the first operation, the flick operation and the drag operation include the element "touch" of the selection operation, and is the second operation in which the element "move" is combined with the element "touch".

When the touch panel 34 receives any operation which is started from the element "touch", the CPU 11 calculates the movement amount of the finger (movement distance of the touch position, hereinafter, also referred to as "movement amount") in the state that the touch panel unit 34 is touched in the operation (Step S101). For example, the CPU 11 calculates the direct distance between the touch position and the position at which the finger is released from the touch panel unit 34, or the length of the movement locus in the touched portion, as the movement amount. In case that the touched portion is in the area in which the operation buttons and the like are arranged, the movement amount in the direction in which the operation buttons are scrolled is calculated as the movement amount. For example, in case of the operation for the area in which the operation buttons are arranged in the lateral direction, the lateral component of the movement amount is calculated.

When the movement amount of the present operation is 0 (Step S102; No), the CPU 11 judges that the selection operation (first operation) is received and executes the first display process corresponding to the selection operation (Step S103).

On the other hand, when the operation has the certain movement amount, that is, the movement amount is more than 0, the CPU 11 judges that the second operation is received (Step S102; Yes). The CPU 11 executes both of the first display process corresponding to the selection operation and the second display process which is different from the first display process (Step S104). In this embodiment, the second display process is the display process corresponding to the flick operation or the drag operation. That is, the selection operation (first operation) is the operation which is constituted by the element "touch". The second operation is the operation in which the action for moving the touch position after the touch panel unit 34 is touched is added, and is the operation including the element ("touch") of the first operation. In Step S102, the CPU 11 judges whether the movement amount is more than 0 or not. Instead, the predetermined small movement amount (for example, 2 mm) is set to the threshold value, and it may be judged whether the movement amount is larger than the threshold value.

Figure 3:
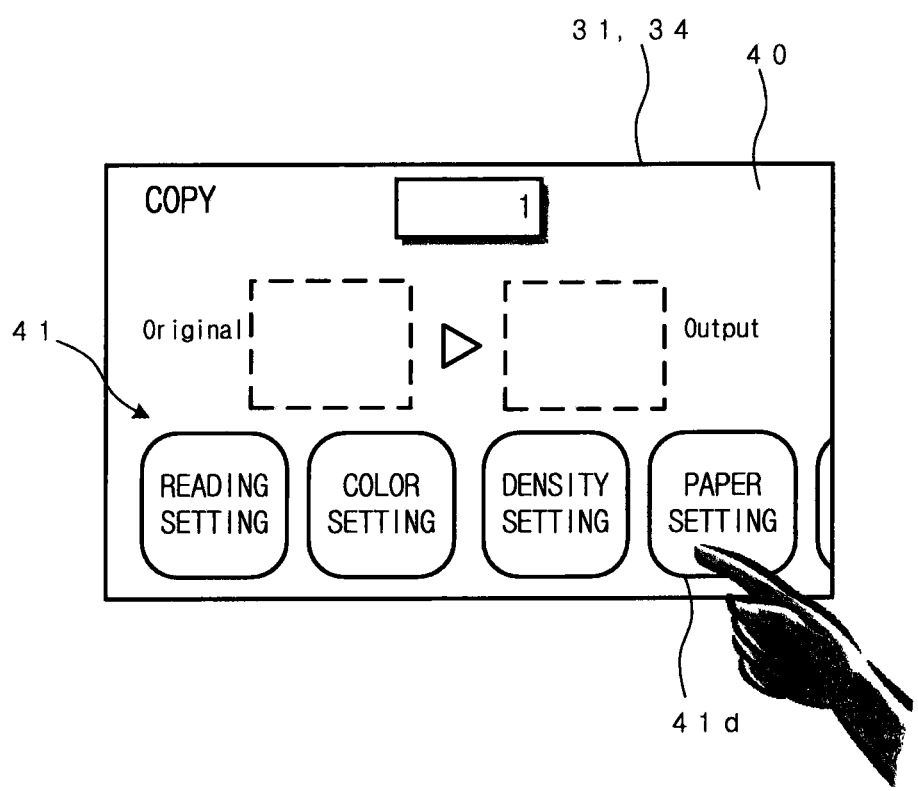
FIG. 3 is a view showing an example of the situation in which the selection operation having the movement amount of 0 is received from the user on the copy window.

FIG. 3 shows an example of the situation in which the selection operation is received from the user on the touch panel unit 34 provided on the display unit 31 of the operation display unit 30. FIG. 3 shows the situation in which the selection operation is received on the copy window 40 for carrying out various types of the settings relating to the copy function. Hereinafter, as an example, the case in which the certain operation is carried out for the copy window 40 will be explained.

In the lower portion of the copy window 40, a plurality of the operation buttons 41 for selecting the setting item are arranged on one line. Because many operation buttons 41 are arranged, all of the operation buttons 41 cannot be displayed in the lower portion of the copy window 40 at one time. In FIG. 3, on the right end of the lower portion of the copy window 40, a part of the operation button 41 is displayed, and it is indicated that the operation buttons 41 hidden on the right side are arranged. FIG. 3 shows the situation in which the user carries out the selection operation for selecting the paper setting operation button 41d with the user's finger. A plurality of operation buttons 41 displayed in the lower portion of the copy window 40 are collectively referred to as the operation button group 41.

Figure 4:
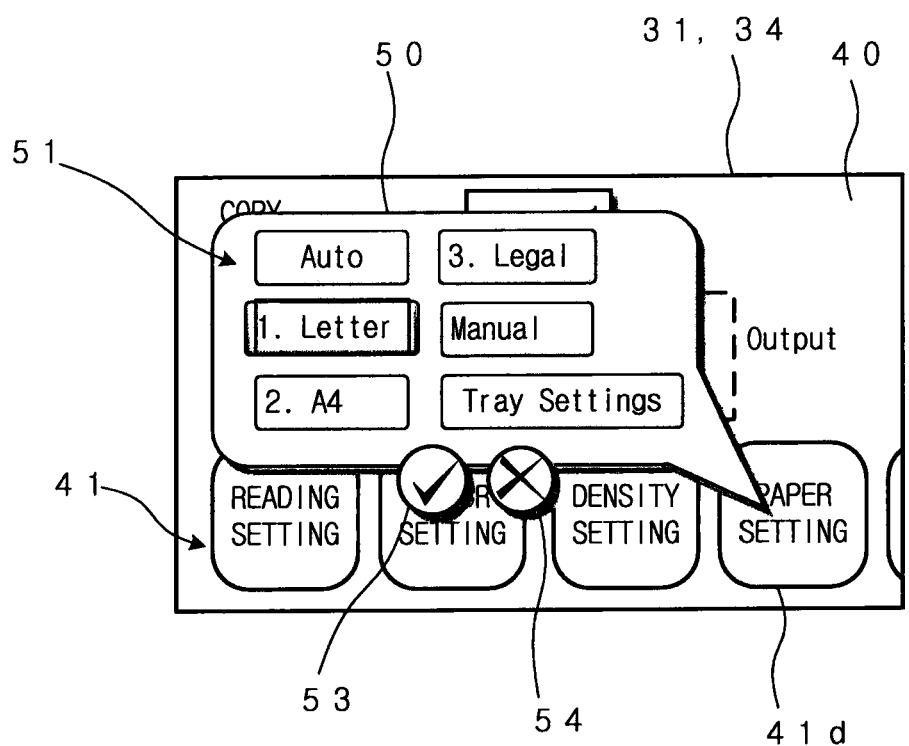
FIG. 4 is a view showing the display status immediately after the selection operation for selecting the paper setting operation button is received in FIG. 3.

FIG. 4 shows the display status immediately after the selection operation for selecting the paper setting operation button 41d is received in FIG. 3. When the selection operation for selecting the paper setting operation button 41d is received (corresponding to Step S102 in FIG. 2; No), the first display process corresponding to the selection operation is executed (corresponding to Step S103 in FIG. 2). As shown in FIG. 4, the pop-up window 50 is displayed on the copy window 40.

In the pop-up window 50, the operation buttons 51, such as the tray selection button for selecting the feed tray, the tray setting button for carrying out various types of settings (for example, the type and the weight of paper) for the feed tray, and the like, are displayed. Further, in the lower portion of the pop-up window 50, the enter button 53 and the cancel button 54 are displayed. When the enter button 53 is pushed, the selection of the operation buttons 51 in the pop-up window 50 and the contents of the settings are decided and the process for closing the pop-up window 50 is executed. When the cancel button 54 is pushed, the selection of the operation buttons 51 and the contents of the settings are canceled and the process for closing the pop-up window 50 is executed.

Figure 5:
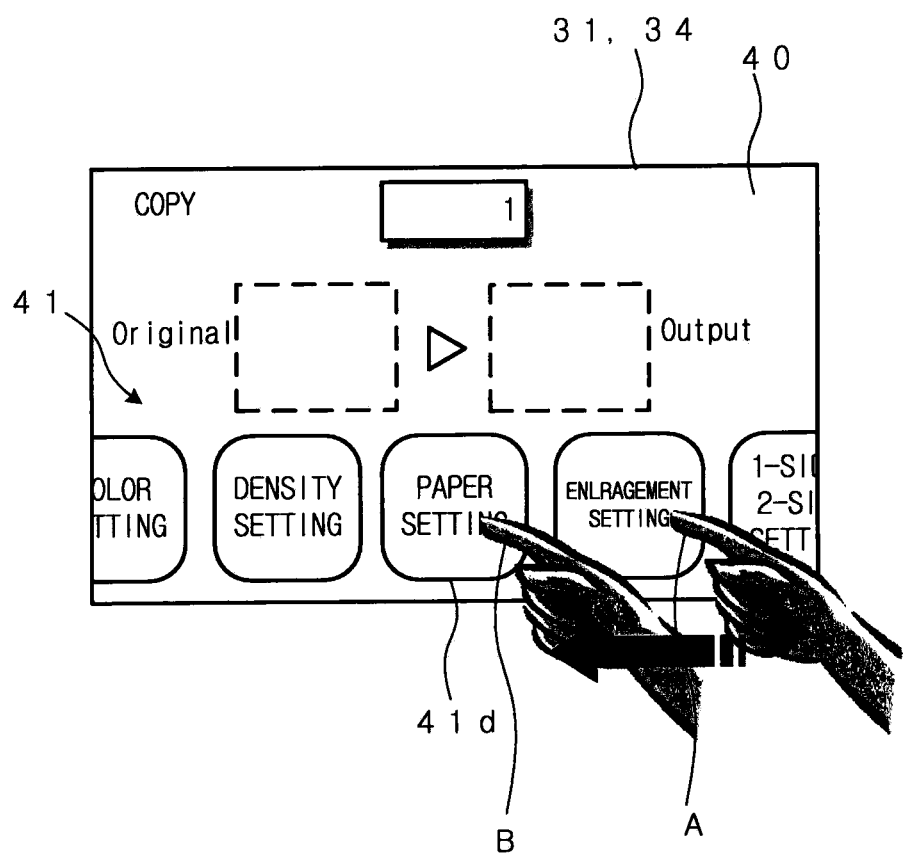
FIG. 5 is a view showing an example of the situation in which the operation having the certain movement amount is received from the user on the copy window.

FIG. 5 shows an example of the situation in which the operation having the certain movement amount which is more than 0 is received from the user on the copy window 40. FIG. 5 shows the situation in which the user carries out the operation by touching the paper setting operation button 41d in the copy window 40 shown in FIG. 3 and moving the user's finger in the left direction by about one operation button 41 in the state that the screen is touched with the finger. The finger position A indicates the touch starting position and the finger position B indicates the finger position to which the finger has been moved from the finger position A in the left direction.

Figure 6:
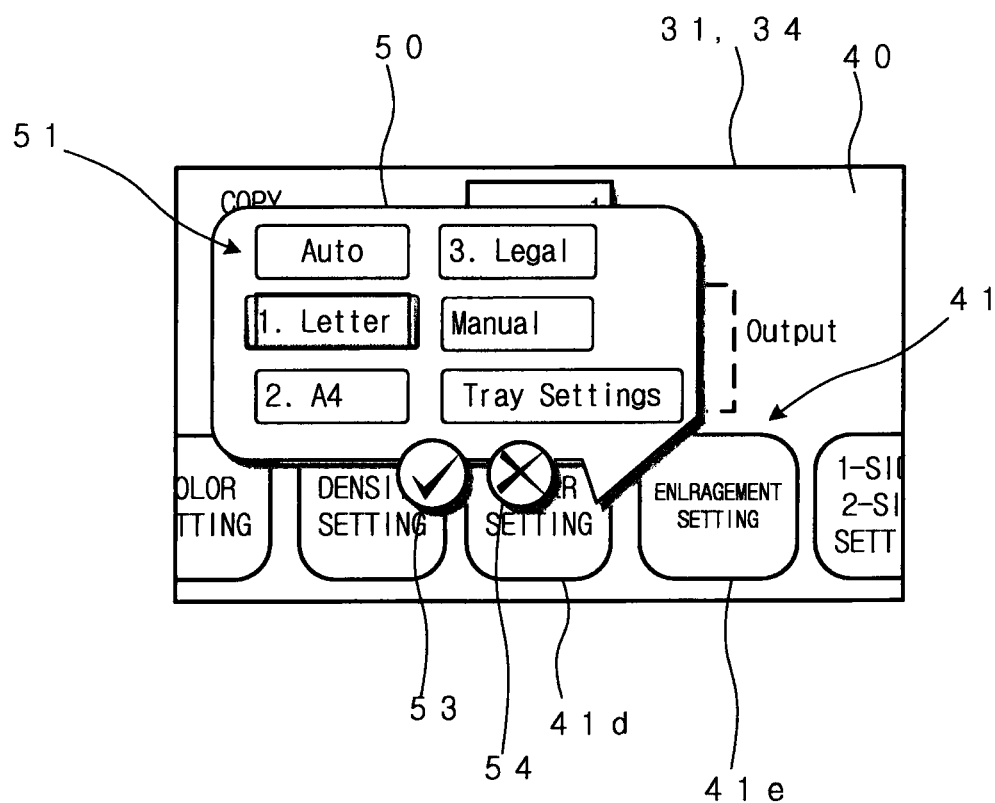
FIG. 6 is a view showing the display status after the operation having the certain movement amount, which is shown in FIG. 5, is received for the paper setting operation button.

FIG. 6 shows the display status after the operation having the certain movement amount, which is shown in FIG. 5, is received for the paper setting operation button 41d. When the operation having the certain movement amount is received for the paper setting operation button 41d (corresponding to Step S102 in FIG. 2; Yes), the first display process and the second display process are executed in accordance with the received operation (corresponding to Step S104 in FIG. 2), and the copy window 40 is displayed as shown in the display status of FIG. 6. That is, the first display process corresponding to the selection operation received for the paper setting operation button 41d is executed and the pop-up window 50 is displayed on the copy window 40. Further, the second display process is executed and the operation button group 41 displayed in the lower portion of the copy window 40 is scrolled in the left direction.

In case that both of the display of the pop-up window 50 according to the first display process and the scroll display of the operation button group 41 according to the second display process are carried out, the pop-up window 50 is displayed so as not to hide the whole of operation button group 41 to be scrolled. That is, a part of the operation button group 41 to be scrolled is displayed. Preferably, each of the operation buttons 41 is at least partially displayed.

As described above, in the first embodiment, in case that the operation having the certain movement amount which is more than 0 is received, both of the first display process (display of the pop-up window 50) corresponding to the selection operation and the second display process (scroll display) relating to the operation having the certain movement amount are executed. Thereby, for example, even though the operation having the movement amount, which is carried out by the user is (1) the operation in which the finger is slightly moved when the user intends to carry out the selection operation, (2) the operation in which the movement amount is small because the flick operation is not well carried out when the user intends to carry out the flick operation, or the like, either the first display process or the second display process is the display process corresponding to the operation which the user intends to carry out. Therefore, the user is not required to repeat the operation, and can continue the operation for the display corresponding to the operation which the user intends to carry out. The operability and the convenience are improved as compared with the case in which the operation is repeated.

For example, in FIG. 6, if the operation which the user intends to carry out is the selection operation of the paper setting operation button 41d, the user can carry out the operation for the displayed pop-up window 50. On the other hand, if the operation which the user intends to carry out is the flick operation, the user can carry out the operation for the enlargement setting operation button 41e or the like which is displayed by scrolling the window.

Further, in case that both of the first display process and the second display process are executed, the pop-up window 50 displayed by the first display process corresponding to the selection operation is displayed so as to show the operation button group 41 to be scrolled. Therefore, the user can recognize the scroll of the operation button group 41 in the state that the pop-up window 50 is displayed. Even though the operation which the user intends to carry out is the flick operation, the user can carry out the operation for the displayed operation button 41. It is possible to continue the next operation smoothly.

Figure 7:
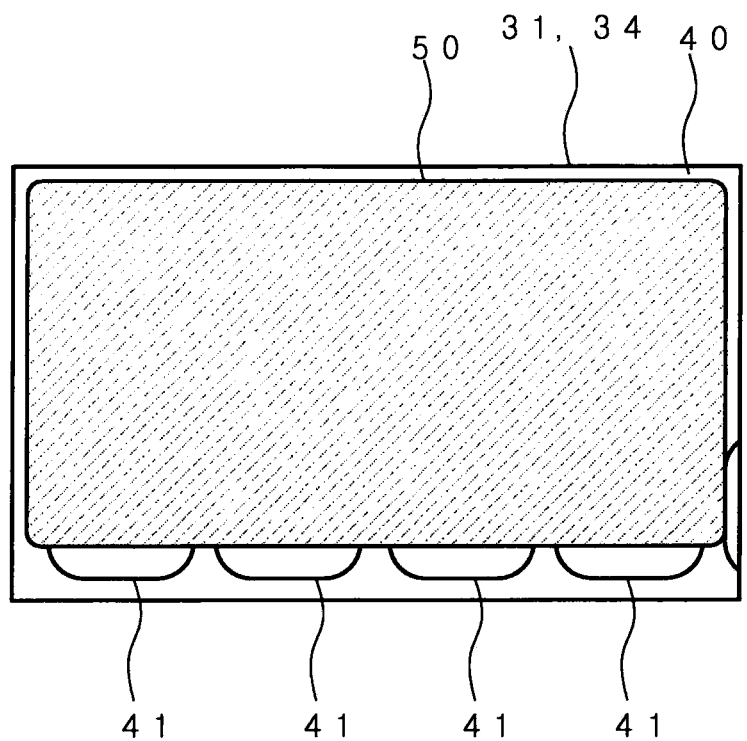
FIG. 7 is a view showing the display window in case that the pop-up window is displayed more largely so as to show a part of the operation button group.

In the above case, it is not necessary to show the whole of the operation button group 41. A part of the operation button group 41 may be shown. For example, as shown in FIG. 7, the pop-up window 50 can be largely displayed so as to show a part of the operation button group 41.

The type of the second display process may be changed by judging whether the operation having the certain movement amount is the flick-based operation or the drag-based operation. For example, in case of the flick-based operation, the display process is executed so as to slow down the scroll from the position at which the finger is released from the screen. In case of the drag-based operation, the display process is executed so as to stop the scroll at the position at which the finger is released from the screen. Further, the flick-based operation or the drag-based operation can be judged as follows. When the movement speed of the finger is not less than the predetermined value at the time of releasing the finger, the operation is judged as the flick-based operation. On the other hand, when the movement speed of the finger is less than the predetermined value, the operation is judged as the drag-based operation.

Second Embodiment:

In the first embodiment, in case that the type of the operation is judged by classifying the movement amount into two categories according to whether the operation has the certain movement amount or the movement amount of the operation is 0. In the second embodiment, the operation received from the user is judged by classifying the movement amount into three categories. The configuration of the multi-function peripheral 10 and that of the operation display unit 30 are the same as those of the first embodiment. The explanation thereof is omitted.

In case that the movement amount (movement distance of the touch position) is sufficiently small after the touch, the operation can be judged as the selection operation. In case that the movement amount is sufficiently large, the operation can be clearly judged as the flick operation (or the drag operation). However, in case that it is not clear whether the movement amount is large or small, it is difficult to clearly judge whether the operation which the user intends to carry out is the selection operation or the flick operation (or the drag operation). Therefore, in the second embodiment, in case that it can be clearly judged whether the operation is the selection operation or the flick operation (or the drag operation), the display process corresponding to the operation judged in accordance with the detected movement amount is executed. On the other hand, only in case that the operation cannot be clearly judged, both of the first display process and the second display process are executed. In this embodiment, the case in which the operation having not less than the predetermined movement amount is judged as the flick operation, will be explained.

Figure 8:
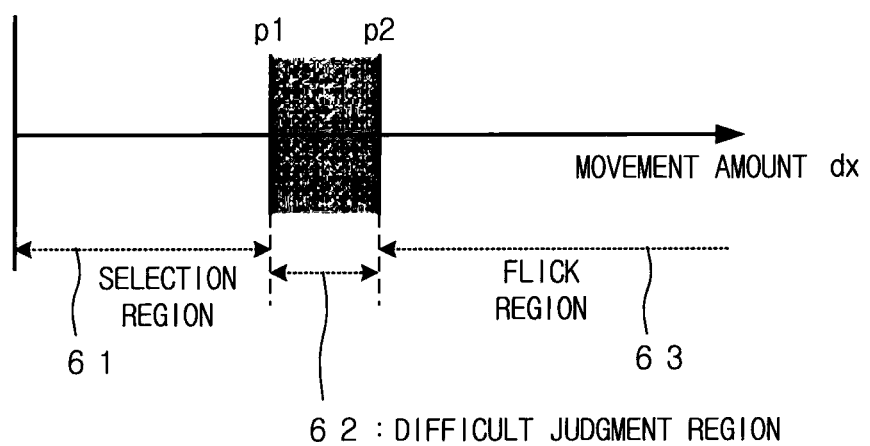
FIG. 8 is a view showing the classification of the operation in accordance with the detected movement amount.

FIG. 8 shows the classification of the operation in accordance with the detected movement amount. When the movement amount dx is within the range p1≤dx<p2, the movement amount is within the difficult judgment region 62 in which it is difficult to judge whether the operation is the selection operation or the flick operation. When the movement amount dx is within the range dx<p1, the movement amount is within the selection region 61 in which the operation is judged as the selection operation. When the movement amount dx is within the range p2≤dx, the movement amount is within the flick region 63 in which the operation is judged as the flick operation.

On the basis of the movement amount, the operation in which the movement amount is within the difficult judgment region 62 is the intermediate operation between the selection operation (in which the movement amount is less than p1) and the flick operation (in which the movement amount is not less than p2). Therefore, it can be said that the intermediate operation is an unclear operation which is similar to both of the selection operation and the flick operation which can be clearly discriminated. In general, in case that the type of the operation is judged in accordance with the predetermined index (movement amount, actuation time, the shape of the movement locus, the combination thereof and the like), when the operation in which the value of the index is less than the first threshold value is the operation A (first operation) and the operation in which the value of the index is not less than the second threshold value is the operation B (third operation), the operation in which the value of the index is not less than the first threshold value and less than the second threshold value is the intermediate operation (second operation) between the operation A and the operation B. Further, in case that if the third operation is stopped in midstream, the operation which has been carried out partway is treated as the second operation and if the second operation is stopped in midstream, the operation which has been carried out partway is treated as the first operation, the second operation is the intermediate operation between the first operation and the third operation.

Figure 9:
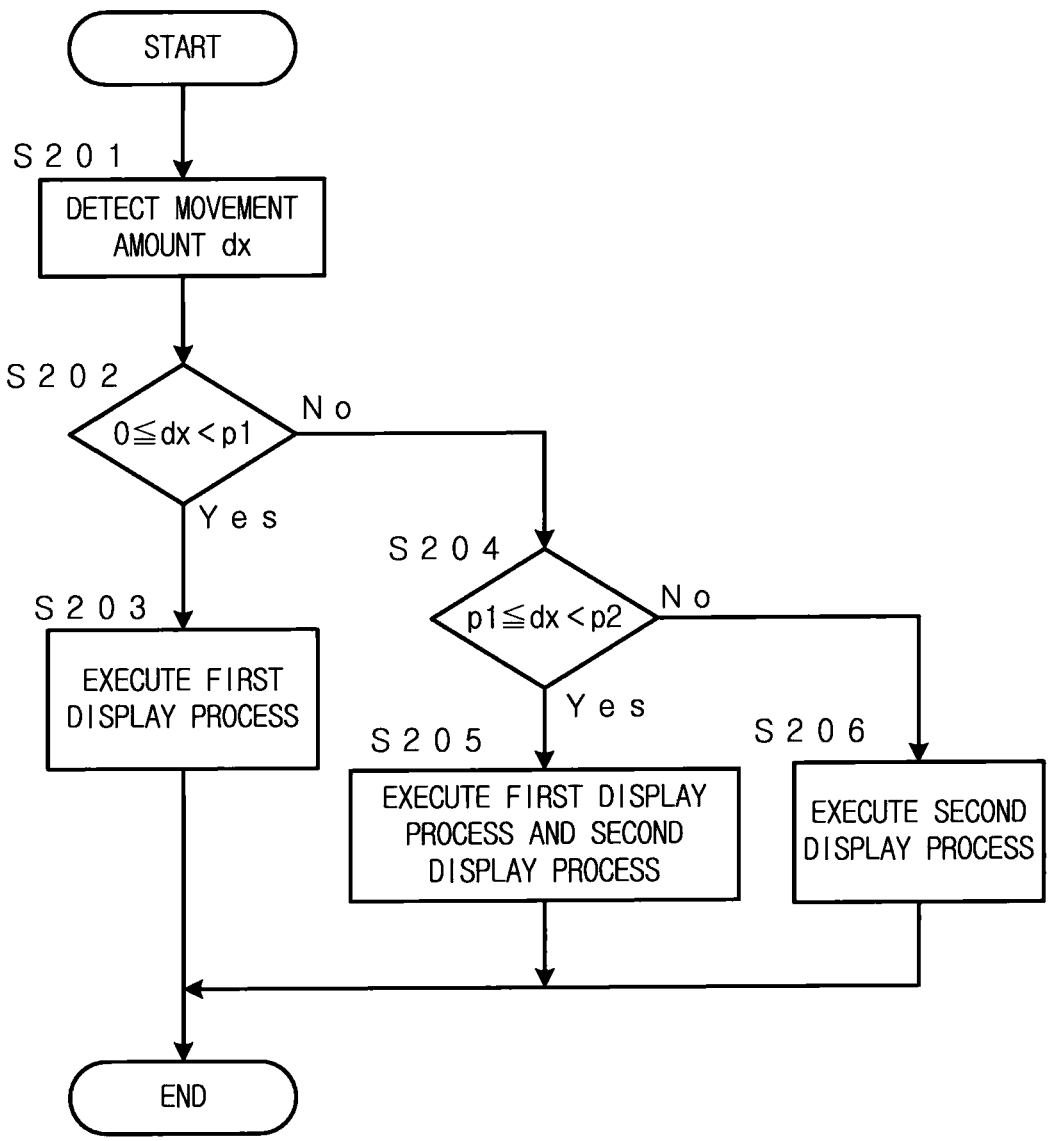

FIG. 9 shows the flowchart of the process which is executed when the operation display device according to the second embodiment receives the operation via the user's finger, a pen or the like. When the touch panel 34 receives any operation which is started from the element "touch", the CPU 11 calculates the movement amount dx of the finger in the state that the touch panel unit 34 is touched in the operation (Step S201).

When the movement amount dx of the received operation is less than p1 (first threshold value), that is, the movement amount dx is within the selection region 61 (Step S202; Yes), the CPU 11 judges that the selection operation (in this embodiment, the first operation) is received and executes the first display process corresponding to the selection operation (Step S203). When the above operation is received for the paper setting operation button 41d of the copy window 40 shown in FIG. 3, the first display process is executed. Then, the pop-up window 50 is displayed as shown in the display status of FIG. 4.

On the other hand, when the movement amount dx is not less than p1 and less than p2 (second threshold value), that is, the movement amount dx is within the difficult judgment region 62 (Step S204; Yes), the CPU 11 executes both of the first display process corresponding to the selection operation and the second display process corresponding to the flick operation (in this embodiment, the third operation) (Step S205). When the above operation (in this embodiment, the second operation) is received on the copy window 40 shown in FIG. 3, the pop-up window 50 is displayed by the first display process and the operation buttons 41 are scrolled by the second display process. Then, the copy window 40 is displayed as shown in the display status of FIG. 6.

Figure 10:
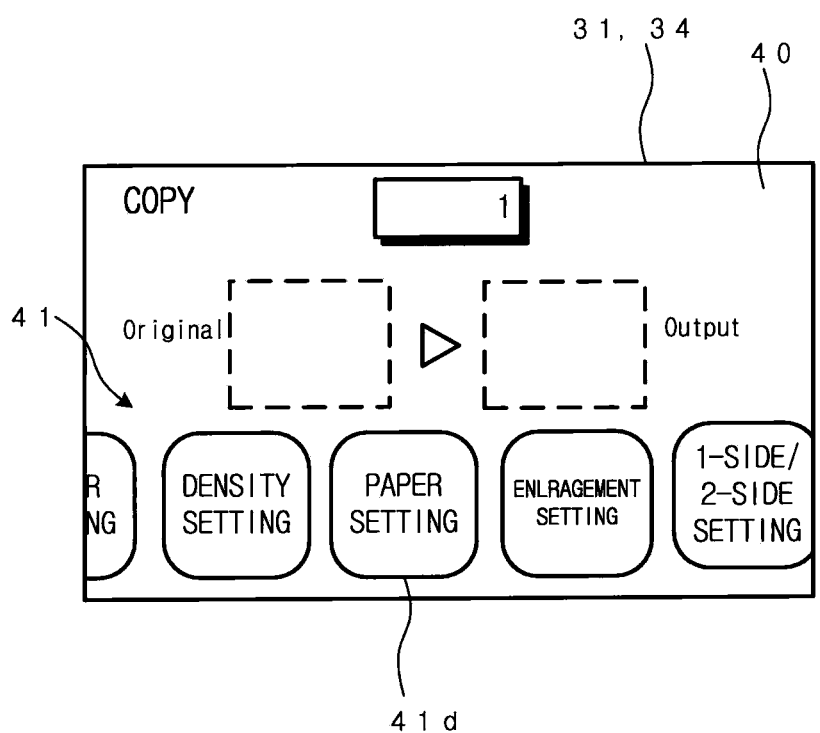
FIG. 10 is a view showing the display status incase that the flick operation is received on the copy window.

When the movement amount dx is not less than p2, that is, the movement amount dx is within the flick region 63 (Step S204; No), the CPU 11 executes the second display process corresponding to the flick operation (Step S206). When the above operation is received on the copy window 40 shown in FIG. 3, the operation buttons 41 are scrolled by the second display process and the copy window 40 is displayed as shown in the display status of FIG. 10.

As described above, in the second embodiment, only in case that it is difficult to judge whether the operation received from the user is the selection operation or the flick operation, the CPU 11 executes both of the first display process corresponding to the selection operation and the second display process corresponding to the flick operation. When the CPU 11 can clearly judge that the operation received from the user is the selection operation or the flick operation, the CPU 11 executes only the display process corresponding to the judged operation. Therefore, the unnecessary status is not displayed on the display unit and the operability of the operation display device is improved more.

Third Embodiment:

In the third embodiment, the process for cancelling one display process in case that the operation for affirming the other display process is received after both of the first display process and the second display process are executed (the process for returning the display status to the original display status in which the cancelled display process has not executed) is added to the first and the second embodiments. The other configuration of the third embodiment is the same as those of the first and the second embodiments.

In this embodiment, by the operation which is carried out for the paper setting operation button 41*d* of the copy window 40, both of the first display process (for displaying the pop-up window 50) and the second display process (for the scroll display of the operation button group) are executed. As a result, the copy window 40 is displayed as shown in the display status of FIG. 6.

(In Case that the First Display Process is Affirmed)

In the display status of FIG. 6, when the user operates the operation button 51 in the pop-up window 50 or the enter button 53 of the pop-up window 50, it is considered that the user affirms the execution of the first display process for displaying the pop-up window 50. That is, it can be judged that the user intends to carry out the selection operation for the paper setting operation button 41*d*.

In this case, the second display process (scroll display) which is executed when the pop-up window 50 is displayed is disaffirmed. Therefore, when pop-up window 50 is closed, the CPU 11 controls the copy window 40 so as to return the operation button group 41 to the same position as before the operation button group 41 is scrolled. That is, the CPU 11 returns the display according to the second display process to the original display. The process for returning the scrolled operation button group 41 to the original position, may be executed when the operation for affirming the first display process is received.

Figure 11A:
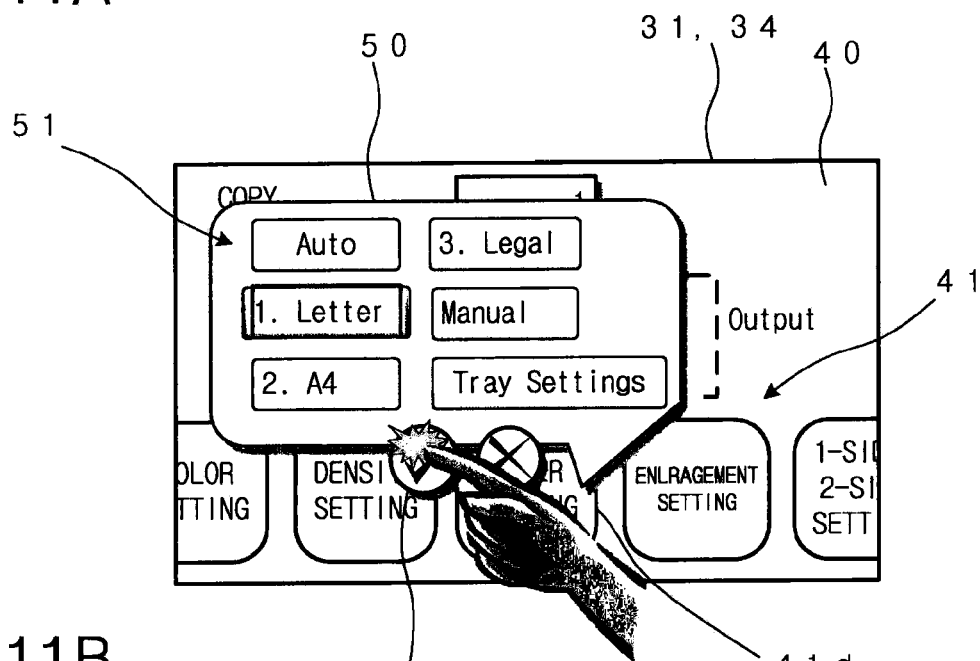
FIGS. 11A and 11B are views showing the change in the display contents, which is caused by operating the enter button in the display status shown in FIG. 6.
Figure 11B:
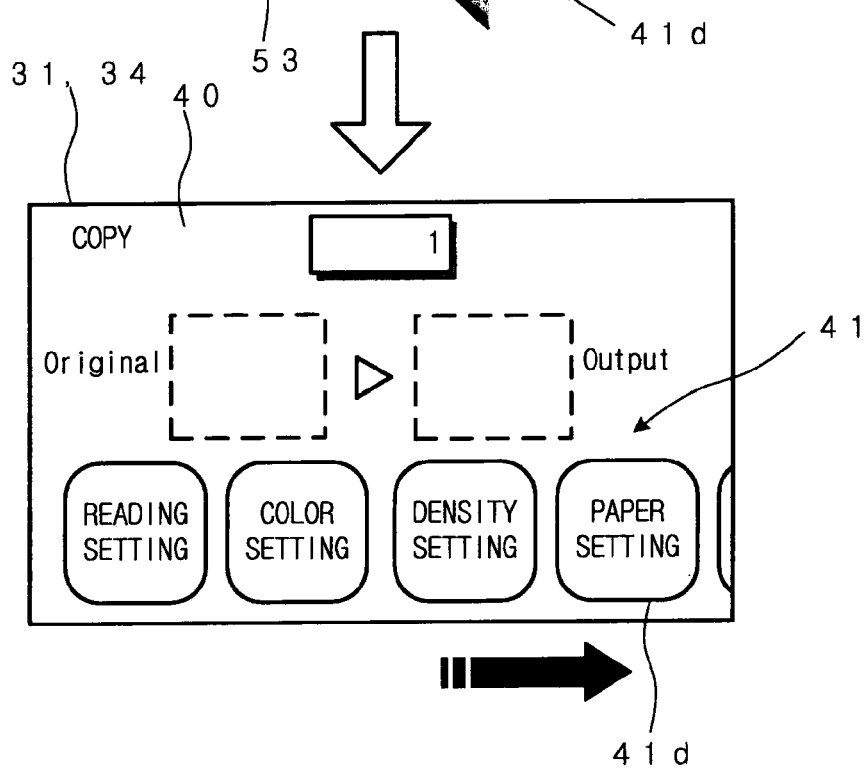

FIG. 11A shows the situation in which the enter button 53 is operated in the display status of FIG. 6. FIG. 11B shows the situation in which the operation button group 41 is returned to the same position as before the operation button group 41 is scrolled, in order to cancel the disaffirmed scroll display. When the operation button group 41 is returned, the motion in which the operation button group 41 is moved to the position as before may be displayed. Alternatively, the situation in which the operation button group has been returned may be immediately displayed.

(In Case that the Second Display Process is Affirmed)

In the display status of FIG. 6, when the user carries out the operation for the area in which the operation button group 41 is arranged, it is considered that the user affirms the execution of the second display process for scrolling the operation button group 41. That is, it can be judged that the user intends to carry out the flick operation.

In this case, because the first display process for displaying the pop-up window 50 is disaffirmed, the CPU 11 controls the copy window 40 so as to close the pop-up window 50. That is, the CPU 11 finishes the first display process.

Figure 12A:
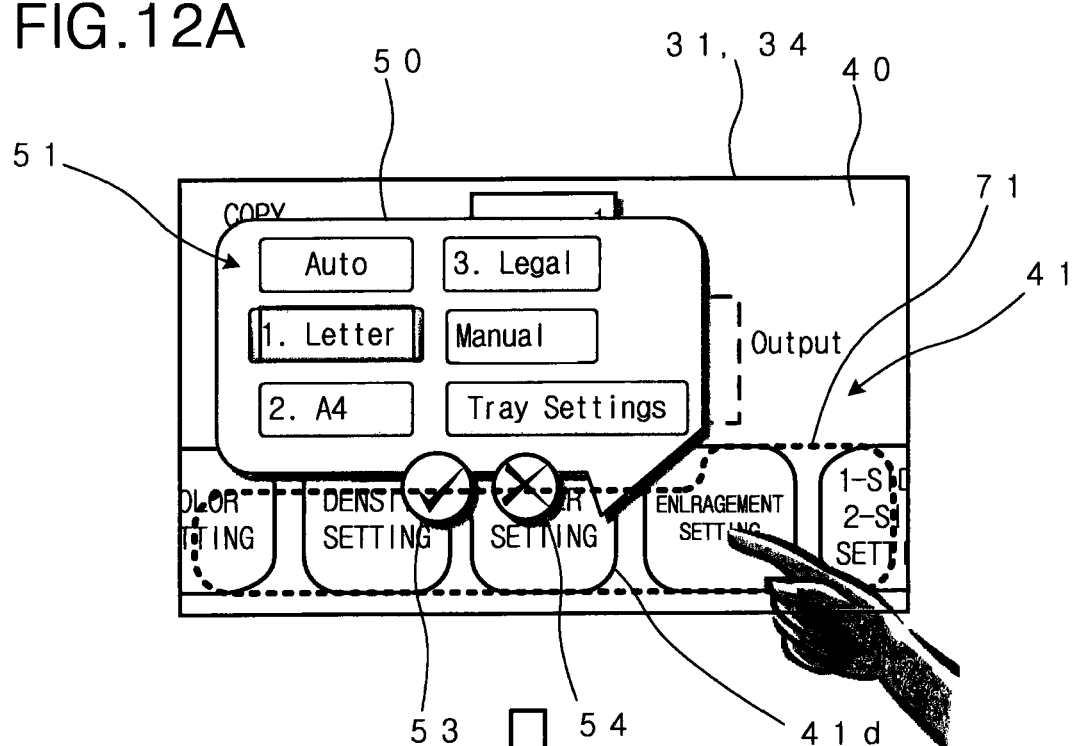
FIGS. 12A and 12B are views showing the change in the display contents, which is caused by receiving the operation for the scroll area in the display status shown in FIG. 6.
Figure 12B:
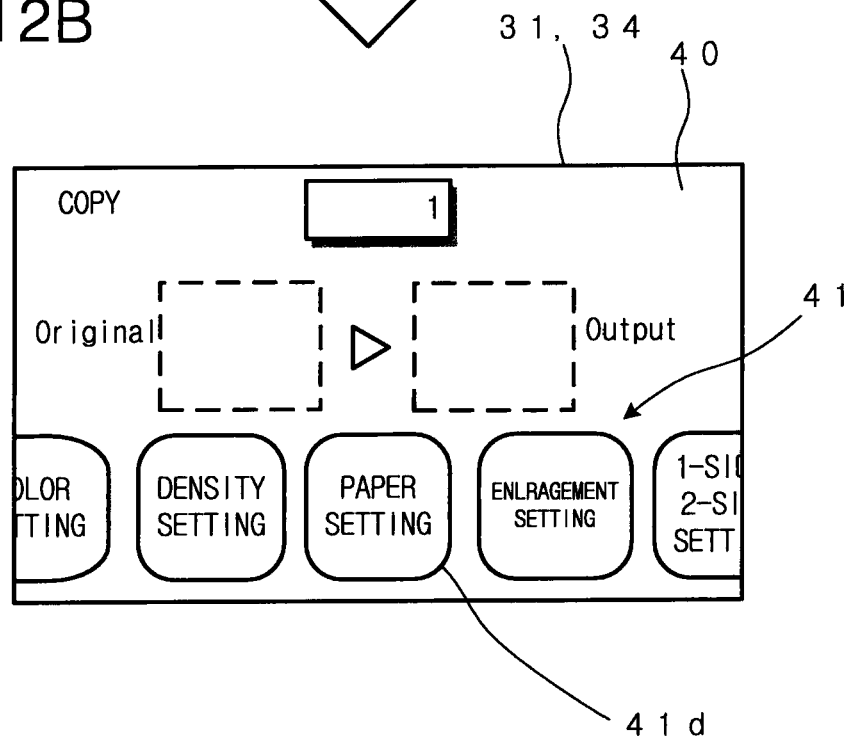

FIG. 12A shows the situation in which the user carries out the operation for the scroll area 71 in which the operation button group 41 is arranged (in the drawing, the scroll area 71 is enclosed by a dashed line which is not actually displayed on the copy window 40.) in the display status of FIG. 6. FIG. 12B shows the situation in which the disaffirmed pop-up window 50 is closed by the above operation. The operation button group 41 is displayed on the position of the operation button group 41 which has been scrolled by the second display process.

In case that the cancel button 54 is operated without operating the operation button 51 in the pop-up window 50, it is considered that the user disaffirms the first display process for displaying the pop-up window 50. In this case, because the pop-up window 50 is closed by operating the cancel button 54, it is not necessary to carry out the separate operation.

As described above, when the operation for affirming one display process is received after both of the first display process and the second display process are executed, the display caused by executing the other display process which is not affirmed is automatically cancelled and the display status is returned to the status in which the other display process has not been executed. Therefore, the user is not required to carry out the separate operation for cancelling the display process corresponding to the operation which the user does not intend to carry out. Thereby, the operability is improved more.

Figure 13:
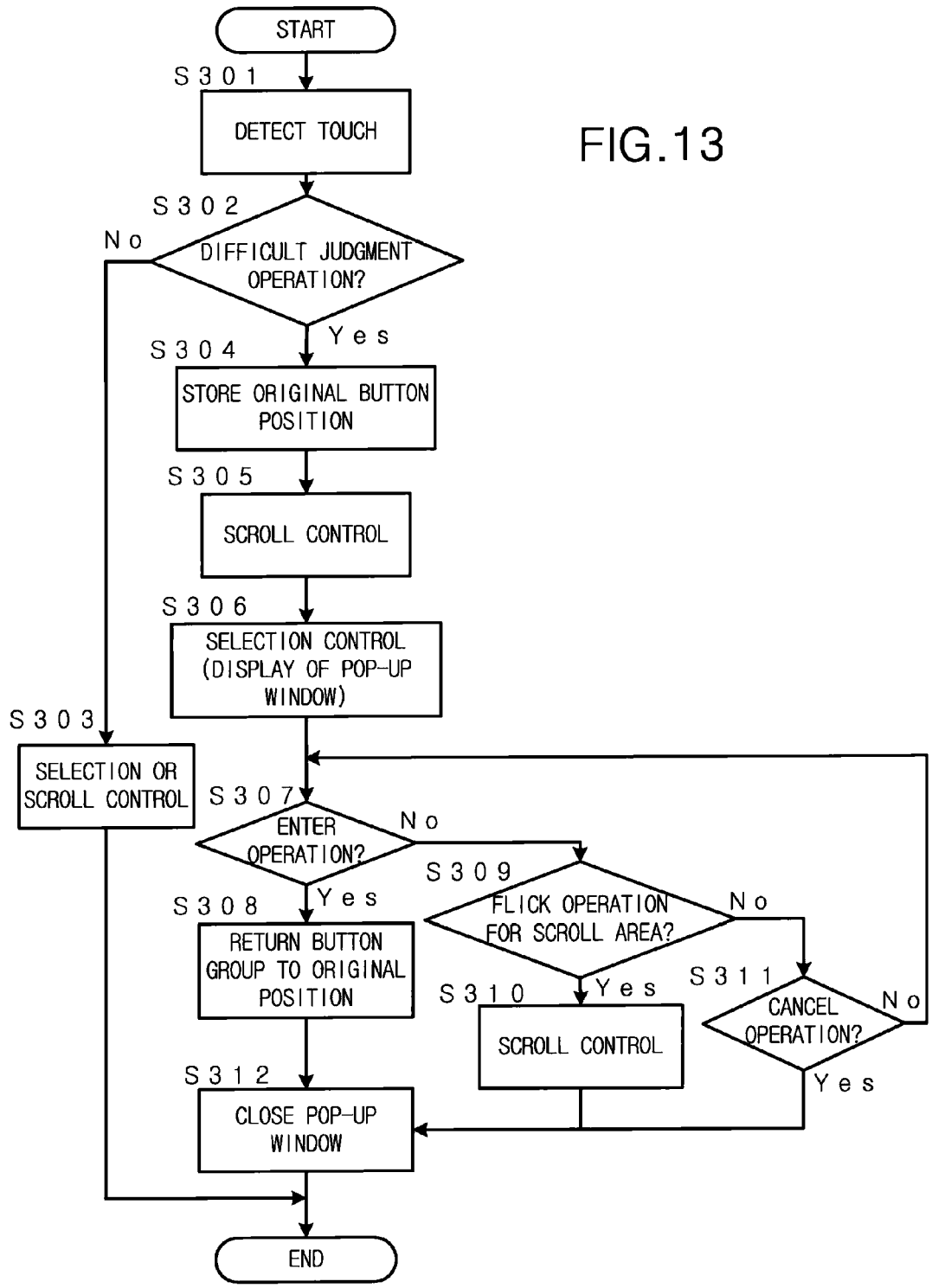

FIG. 13 shows the flowchart of the process which is executed when the operation display device according to the third embodiment receives the operation via the user's finger, a pen or the like. When the touch panel 34 receives any operation which is started from the element "touch" (Step S301), the CPU 11 judges whether the received operation is the selection operation in which the movement amount dx is within the selection region 61, the difficult judgment operation in which the movement amount dx is within the difficult judgment region 62 or the flick operation in which the movement amount dx is within the flick region 63, in accordance with the movement amount dx of the finger in the state that the touch panel unit 34 is touched in the operation (Step S302).

When the CPU 11 judges that the received operation is the selection operation or the flick operation (Step S302; No), the CPU 11 executes the display process corresponding to the judged operation (Step S303). Then, the process is ended. When the received operation is the difficult judgment operation (Step S302; Yes), the CPU 11 stores the current position of the operation button group 41 in the RAM 13 or the like as the original button position (Step S304). Then, the CPU 11 executes the second operation display (scroll display) corresponding to the flick operation (Step S305). At the same time, the CPU 11 executes the first display process (for displaying the pop-up window 50) corresponding to the selection operation (Step S306).

Then, the CPU 11 waits for any operation from the user. In case that the received operation is the operation for affirming the first display process, such as the operation for the enter button 53 (Step S307; Yes), the CPU 11 controls the copy window 40 so as to return the operation button group 41 which is scrolled by the second display process to the original button position stored in Step S304 (Step S308). Further, because the enter button 53 is operated, the CPU 11 closes the pop-up window 50 (Step S312). Then, the process is ended.

When the operation for the scroll area 71 is received, for example, when the scroll operation is carried out (Step S309; Yes), the CPU 11 executes the process for scrolling the operation button group 41 (Step S310). Further, because the first display process is disaffirmed by the above operation, the CPU 11 closes the pop-up window 50 (Step S312). Then, the process is ended.

When the operation for the cancel button 54 of the pop-up window 50 is received (Step S311; Yes), the CPU 11 closes the pop-up window 50 (Step S312). Then, the process is ended.

Fourth Embodiment:

In the first to the third embodiments, the case in which the pop-up window 50 is displayed by the first display process is explained. In the fourth embodiment, the current window is changed to another window by the first display process. For example, when the selection operation for one operation button 41 is received in the copy window 40, the copy window 40 is changed to another window.

Figure 14A:
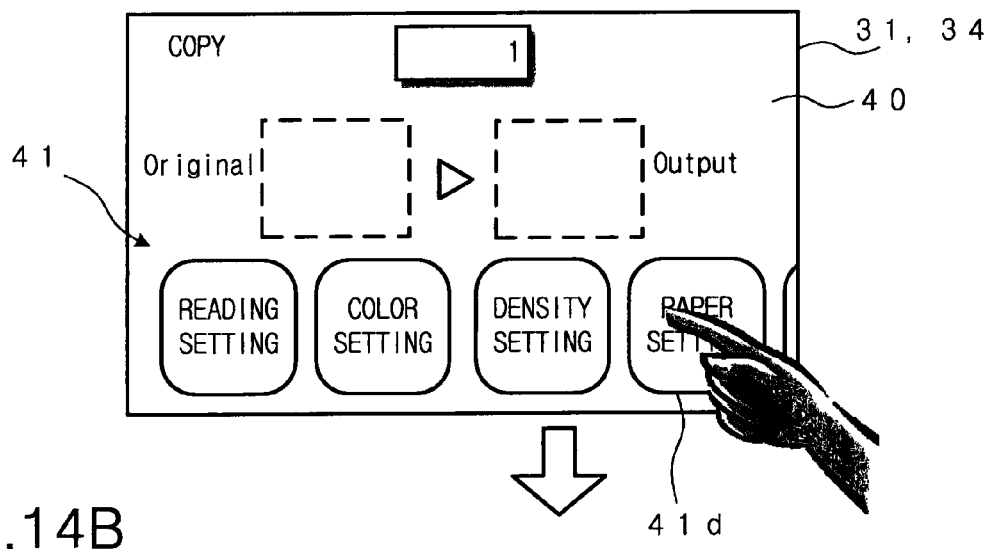
FIGS. 14A to 14C are views showing an example of the display contents in case that the window is changed by the first display process.
Figure 14B:
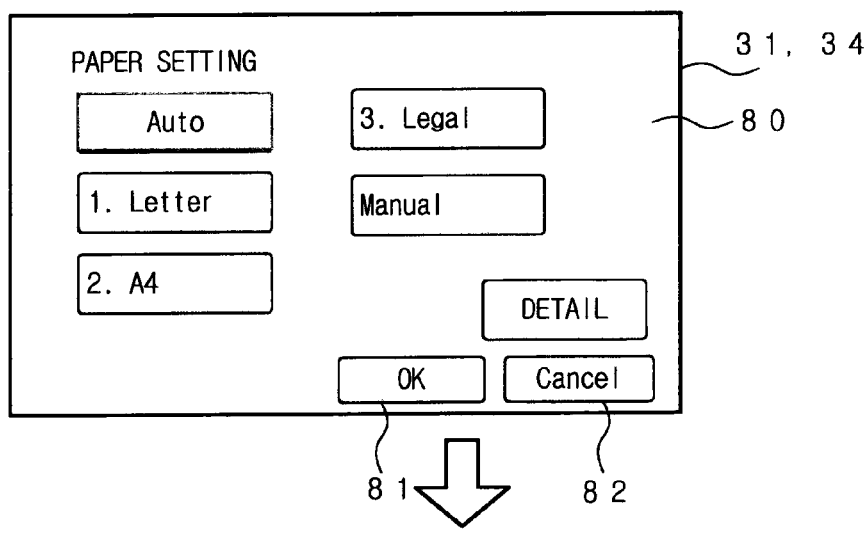
Figure 14C:
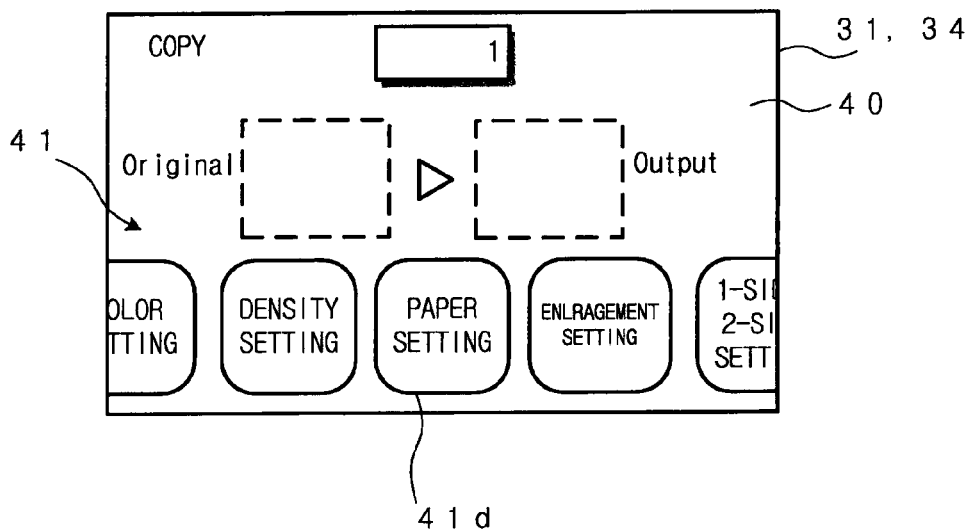

FIGS. 14A to 14C show an example of the display contents in case that the window is changed by the first display process. In FIGS. 14A to 14C, the case in which the paper setting operation button 41d is operated in the copy window 40 is shown. By the operation, both of the first display process and the second display process are executed.

By the first display process, the window is changed. As shown in FIG. 14B, the paper setting window 80 is displayed on the display unit 31 of the operation display unit 30. When whole of the window is changed as described above, the operation button group 41 of the copy window 40 is not displayed. Therefore, the operation button group 41 cannot be scrolled on the paper setting window 80.

When the operation for the paper setting operation button 41d is received on the copy window 40, the CPU 11 calculates the position of the operation button group 41 which has been moved by scrolling the operation button group 41 in accordance with the above operation and stores the calculated position in the RAM 13 or the like. Then, when the trigger for changing the window from the paper setting window 80 to the copy window 40 is caused by carrying out the operation (for example, the pushing operation for the OK button 81 or the cancel button 82) in the paper setting window 80 by the user, the CPU 11 displays the copy window 40 on the display unit 31. In the copy window 40, as shown in FIG. 14C, the operation button group 41 is displayed on the stored position of the operation button group 41 which has been scrolled. Alternatively, after the window is returned to the copy window 40, the CPU 11 may scroll the operation button group 41.

In the paper setting window 80 to which the window is changed, in case that the operation for affirming the window change is received, when the window is returned to the copy window 40, the operation button group 41 may be displayed on the original button position. Because the disaffirmed display process is automatically cancelled, the operability is improved. In case that the disaffirming operation is received in the paper setting window 80, for example, in case that the cancel button 82 is operated before another operation is received, the scroll display is affirmed. Therefore, when the window is returned to the copy window 40, the CPU 11 displays the operation button group 41 on the stored position of the operation button group 41 which has been scrolled.

As described above, the embodiments are explained by using the drawings. However, in the present invention, the concrete configuration is not limited to the above embodiments. In the present invention, various modifications of the above embodiment or the addition of various functions or the like to the embodiments can be carried out without departing from the gist of the invention.

In the above embodiments, the example in which the operation display unit 30 is provided in the multi-function peripheral 10 is explained. However, the operation display device can be provided in another apparatus. Further, the operation display device may be a separate device from the main body of the apparatus. In this case, the operation display device comprises a display control unit which is different from the CPU of the main body and the above display control unit controls the display contents of the operation display device. Further, the above operation display device may comprise a storing unit for temporarily storing various data, such as the position of the operation button group.

In the above embodiments, the first operation for causing the first display process is the selection operation which includes the element "touch" and has no movement amount (or has the slight movement amount), and the second operation for causing the execution of both of the first display process and the second display process is the operation which includes the element "touch" of the first operation and which has the movement of the touch position or the like (the operation having the movement amount of more than 0 or the difficult judgment operation). However, the first operation and the second operation are not limited to these. For example, the first operation may be the short-time pushing operation and the second operation may be the pushing operation in which the pushing time is longer than that of the first operation. That is, the second operation includes the element of the first operation for pushing the button for the predetermined time and is the operation in which the action for pushing the button for the additional predetermined time is added.

When the pushing time is t, in case of $t<t1$, the operation is defined as the first operation. In case of $t1 \leq t < t2$, the operation is defined as the second operation. In case of $t2 \leq t$, the operation is defined as the third operation.

In the operation display device, when the first operation is carried out, the first display process may be executed. When the second operation is carried out, both of the first display process and the second display process may be executed. When the third operation is carried out, the second display process may be executed. In this case, both of the second operation and the third operation include the element of the first operation in which the touch panel unit is touched for less than t1 and are the operation in which the element for continuously touching the touch panel is added. When the type of the operation is judged on the basis of the touch time, the second operation is the intermediate operation between the first operation and the third operation.

Further, for example, the first operation in which the first display process is executed may be defined as the area selection operation which is carried out by moving the finger with which the touch panel unit is touched. The third operation in which the second display process is executed may be defined as the flick operation which is carried out by releasing the finger from the touch panel unit so as to flick the touch panel unit after the finger is moved. The operation in which it is difficult to judge whether the action which is carried out immediately before the finger is released is the action for flicking the touch panel unit, may be judged as the second operation in which both of the first display process and the second display process are executed.

Further, for example, the first operation in which the first display process is executed may be defined as the operation for drawing a circle. The third operation in which the second display process is executed may be defined as the operation for drawing a squire. The operation for drawing an ambiguous figure in which it is difficult to judge whether the figure is a circle or a squire, may be defined as the second operation in which both of the first display process and the second display process are executed.

The contents of the first display process and the second display process are not limited to those of the above embodiments. These display processes may include the process for enlarging or reducing a displayed image, the process for rotating an image, and the process for deforming an image. Further, the display processes may include the process for starting up and displaying another application, for example, the process for opening and displaying a dictionary or the like.

One of the objects of the above embodiments is to provide the touch panel type of operation display device for improving the operability. For example, one of the objects is to provide an operation display device which can reduce the trouble and the inconvenience of repeating the operation which is wrongly judged and which can execute the display processes corresponding to two operations by one operation.

In at least one of the above embodiments, when the first operation is received, the first display process is executed. When the second operation which includes the element of the first operation is received, both of the first display process and the second display process are executed. The second operation is the operation which includes the whole of the first operation or a part of the first operation as the element of the operation.

In at least one of the above embodiments, by receiving the operation for affirming one display process from the user, it is judged that the other display process is the unnecessary process for the user. Then, the other display process is finished or the display according to the other display process is returned to the original display as before the other display process is executed. Thereby, it is possible to avoid the trouble of carrying out the separate operation for finishing the other display process which is unnecessary for the user.

In at least one of the above embodiments, when the first operation is received, the first display process is executed. When the third operation is received, the second display process is executed. When the second operation which is the intermediate operation between the first operation and the third operation is received, both of the first display process and the second display process are executed. For example, the intermediate operation is an unclear operation which is confusingly similar to both of the first operation and the third operation.

In at least one of the above embodiments, the second operation is the operation in which the action for moving the touch position is added to the action for touching the touch panel unit on the specific position, which is the element of the first operation.

In at least one of the above embodiments, in case that the movement distance of the touch position is short (less than the first threshold value), it is judged that the first operation (the selection operation) is received and the first display process is executed. In case that the movement distance of the touch position is sufficiently long (not less than the second threshold value), it is judged that the third operation (for example, the flick operation) is received and the second display process is executed. On the other hand, in case that the movement distance is the intermediate value (not less than the first threshold value and less than the second threshold value), it is difficult to clearly judge whether the operation which the user intends to carry out is the first operation or the third operation. Therefore, in case that the above unclear operation is received, both of the first display process and the second display process are executed.

In at least one of the above embodiments, even though the displaying of the pop-up window according to the first display process and the scroll display of the objects according to the second display process are executed at the same time, the pop-up window does not hide the whole of the objects to be scrolled. Therefore, the user can visually recognize the scroll display of the objects.

In at least one of the above embodiments, when the operation for affirming the displaying of the pop-up window is received, it is judged that the scroll display is the unnecessary process for the user. The scroll display is cancelled and the objects are returned to the position as before the scroll. Thereby, the user is not required to carry out the separate operation for cancelling the unnecessary scroll display so as to return the objects to the original position. It is possible to reduce the trouble thereof.

In at least one of the above embodiments, when the operation for affirming the scroll is received, it is judged that the displaying of the pop-up window is the unnecessary process for the user and the pop-up window is closed. Thereby, the user is not required to carry out the separate operation for closing the pop-up window. It is possible to reduce the trouble thereof.

In at least one of the above embodiments, in case that the first display process is the process for changing the window and the second display process is the process for the scroll display, the objects to be scrolled by the second display process are not displayed in the window changed by the first display process. Therefore, the scroll display according to the second display process is executed in the original window to which the changed window is returned.

According to the operation display device, the operability of the touch panel is improved. For example, it is possible to reduce the trouble and the inconvenience of repeating the operation which is wrongly judged.

What is claimed is:

1. An operation display device comprising:
   a touch panel unit to detect a touched position;
   a display unit; and
   a display control unit,
   wherein when a first operation in which the touch panel unit is touched on a specific position is received on the touch panel unit, the display control unit executes a display for displaying information corresponding to the touched position according to a first display process on the display unit, and
   wherein when a second operation which includes an element of the first operation and in which an action for moving the touched position is added is received on the touched panel unit, the display control unit executes a display to be executed when the touched position is moved according to a second display process and the display for displaying the information corresponding to the touched position which is touched before the touched position is moved according to the first display process, on the touch panel unit at a same timing.

2. The operation display device of claim 1, wherein after the display control unit executes both of the display according to the first display process and the display according to the second display process, when an operation for affirming one of the first display process and the second display process is received from a user, the display control unit finishes the other display process or returns the display according to the other display process to an original display.

3. The operation display device of claim 1, wherein the first operation is a selection operation in which the touch panel unit is touched on a specific position, and
   the second operation is an operation in which an action for moving the touched position after the touch panel unit is touched is added.

4. The operation display device of claim 3, wherein in case that a movement distance of the touched position is less than a first threshold value, the display control unit judges that the first operation is received and executes the display according to the first display process without executing the display according to the second display process;

in case that the movement distance of the touched position is not less than the first threshold value and less than a second threshold value which is larger than the first threshold value, the display control unit judges that the second operation is received and executes both of the display according to the first display process and the display according to the second display process; and in case that the movement distance of the touched position is not less than the second threshold value, the display control unit judges that the third operation is received and executes the display according to the second display process without executing the display according to the first display process.

5. The operation display device of claim 1, wherein the first display process is a process for displaying a pop-up window,
    the second display process is a process for scrolling and displaying objects, and
    in case that the display control unit executes both of the display according to the first display process and the display according to the second display process, the display control unit displays the pop-up window by the first display process so as to show at least a part of the objects to be scrolled by the second display process.

6. The operation display device of claim 5, wherein when an operation for the objects scrolled by the second display process is received in a state that the display control unit executes both of the display according to the first display process and the display according to the second display process, the display control unit closes the pop-up window which is displayed by the first display process.

7. The operation display device of claim 1, wherein the first display process is a process for changing a window displayed on the display unit to another window,
    the second display process is a process for scrolling and display objects, and
    in case that the display control unit executes both of the display according to the first display process and the display according to the second display process, the display control unit calculates and stores a position of the objects scrolled by the second display process and executes the change of the window to the another window by the first display process, and when the another window is returned to an original window, the display control unit executes a display in which the objects are moved to the stored position.

8. An operation display device comprising:
    a touch panel unit to detect a touched position;
    a display unit; and
    a display control unit,
    wherein the display control unit judges a type of an operation in accordance with a predetermined index, in case that a value of the predetermined index is less than a first threshold value, the display control unit judges that a first operation is received on the touch panel unit, in case that the value of the predetermined index is not less than the first threshold value and is less than a second threshold value which is more than the first threshold value, the display control unit judges that a second operation is received on the touch panel unit, in case that the value of the predetermined index is not less than the second threshold value, the display control unit judges that a third operation is received on the touch panel unit, when the first operation is received on the touch panel unit, the display control unit executes a display according to a first display process on the display unit, when the second operation is received on the touch panel unit, the display control unit executes both of the display according to the first display process and a display according to a second display process on the display unit, and when the third operation is received on the touch panel unit, the display control unit does not execute the display according to the first display process and executes the display according to the second display process.

9. An operation display device comprising:
    a touch panel unit to detect a touched position;
    a display unit; and
    a display control unit to execute a display according to a first display process which is a process for displaying a pop-up window on the display unit, when a first operation is received on the touch panel unit, and to execute both of the display according to the first display process and a display according to a second display process which is a process for scrolling and displaying objects on the display unit, when a second operation including an element of the first operation is received on the touch panel unit,
    wherein in the case that the display control unit executes both of the display according to the first display process and the display according to the second display process, the display control unit displays the pop-up window by the first display process so as to show at least a part of the objects to be scrolled by the second display process and the display control unit stores a display position of the objects to be scrolled by the second display process, the display position being positioned before the objects are scrolled, and
    when an operation for affirming the displaying of the pop-up window displayed by the first display process is received, the display control unit displays the objects so as to return the objects scrolled by the second display process to the stored display position.

* * * * *